United States Patent
Thompson et al.

(10) Patent No.: US 7,698,415 B1
(45) Date of Patent: Apr. 13, 2010

(54) NETWORKED PORT-INVENTORY SYSTEM AND METHOD

(75) Inventors: Jeremy Taylor Thompson, Gardner, KS (US); John Allen Schutter, Lawrence, KS (US); Michael L. Wise, Orrick, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1162 days.

(21) Appl. No.: 10/974,289

(22) Filed: Oct. 27, 2004

(51) Int. Cl.
*G06F 15/173* (2006.01)

(52) U.S. Cl. .................. 709/224; 709/203; 709/220; 709/223; 707/31

(58) Field of Classification Search ............ 709/203, 709/220, 223, 224, 245; 707/3, 4, 5
See application file for complete search history.

(56) References Cited

U.S. PATENT DOCUMENTS

| | | | | |
|---|---|---|---|---|
| 6,377,987 B1 * | 4/2002 | Kracht | ................ | 709/220 |
| 6,393,483 B1 * | 5/2002 | Latif et al. | ................ | 709/226 |
| 6,711,615 B2 * | 3/2004 | Porras et al. | ................ | 709/224 |
| 6,721,275 B1 * | 4/2004 | Rodeheffer et al. | ......... | 370/238 |
| 6,934,749 B1 * | 8/2005 | Black et al. | ................ | 709/224 |
| 2002/0174206 A1 * | 11/2002 | Moyer et al. | ................ | 709/221 |
| 2003/0126195 A1 * | 7/2003 | Reynolds et al. | ............ | 709/203 |
| 2006/0059262 A1 * | 3/2006 | Adkinson et al. | ............ | 709/225 |

* cited by examiner

*Primary Examiner*—William C Vaughn, Jr.
*Assistant Examiner*—Mohamed Ibrahim

(57) ABSTRACT

A method, system, and medium are provided for taking port inventories over a network. The process uses a web form which receives either an IP address or a device name for a particular piece of equipment, e.g., a network switch. After submission of this identifier, the system uses a Perl script to access an inventory management application associated with the piece of equipment and extract port information. The port information extracted reveals the number of ports which are both unconnected and unconfigured. This number is then used for resource management or other purposes.

20 Claims, 5 Drawing Sheets

US 7,698,415 B1

NETWORKED PORT-INVENTORY SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of taking port inventories of computing devices, e.g., network switches. More specifically, the invention is related to taking port inventories over a network.

BACKGROUND OF THE INVENTION

Large pieces of computing equipment, e.g., network switches, routers, typically have a multiplicity of what are called "ports" thereon. Ports are physical interfaces between the equipment and a circuit. The other end of the circuit may be another computing device, or some other kind of electronic equipment.

It is important for both technical and business reasons that a systems administrator know which ports on which switches are available, and which ports are not. When an entity becomes responsible for managing numerous switches and other large computing devices, inventories must be periodically taken to determine port availability. Determining port availability—from an asset-management standpoint—can become a daunting task.

Conventionally, port inventories are taken by accessing the equipment, e.g., a switch, using some form of direct IP connection. Oftentimes the equipment will have a server associated with it. At least a portion of this server will be devoted to maintaining port-status information. A user may access this server via a PC or other computing means. Normally software is provided which enables the user to navigate through directories in the server to find the relevant port-status information.

This is an okay technique for small operations, e.g., to determine the availability of only a few ports. But where the entity manages a significant number of devices, it becomes cumbersome to undergo the burden of obtaining the necessary port-availability information using the existing applications to locate the necessary information.

FIG. 1 shows an environment in which the conventional process might take place. Referring to the figure, we see that a prior art system 100 includes numerous components. First, system 100 usually incorporates a workstation 102, a server 104, and a piece of equipment 106, such as a network switch. Network switches normally have hundreds of ports. For the purpose of simplifying matters, however, only a few ports have been shown on the exemplary switch 106 in FIG. 1.

These ports are identified as Port 1, Port 2, Port 3, and Port N. Of these ports, Ports 1 and 2 are shown being connected to devices Dev. 1 and Dev. 2. Port 3 is shown as being not connected to any device. Port N is disclosed as being connected to Dev. N. The use of the variable "N" here is used to indicate that numerous ports would more likely be included on switch 106.

Oftentimes, it will be desirable for a network administrator to monitor exactly which of these ports on equipment 106 are configured, and also which of these ports are connected to a device. Either scenario typically makes a port unavailable for new uses. When availability information is desired, the prior art method of obtaining this information is rather painstaking.

The process involves accessing server 104 using workstation 102. A software package running on server 104 is likely a program designed with the capability of performing inventory management, among other things. One such conventional software application which may be used to do port inventories is known as Ciscoworks™. Ciscoworks™ enables, when accessed by a user on workstation 102, allows the user (by navigating through directories) to access ports information regarding equipment 106. This information must be obtained one port at a time. For example, the user may want to know whether certain ports on device 106 are available. To do so, the user would navigate through Ciscoworks™ to access inventory information regarding one of the hundreds of ports, e.g., Port 1. Ciscoworks™ would then inform the user that a device (Dev. 1) is existent on that port. With respect to Port 3, however, the user would, by navigation, be able to pull up the information on Port 3 and determine that it is disconnected, or not connected to a device. Another ability of Ciscoworks™ is to determine whether ports, even though not connected, might be configured.

Ciscoworks™ requires the user to obtain individually the information for each port. Next, the user must maintain a record of whether each port is or is not connected. If multiple devices such as equipment 106 are being inventoried—as is commonly the case—this will be a lot of information to write down.

Other methods and devices for conducting inventories of equipment are available. Ciscoworks™, however, is arguably the most commonly used conventional product.

These prior-art techniques have their limitations. First of all, the port-inventory-taking process takes a lot of time. This is because the person doing the inventory, with the conventional methods, has to count the free ports one at a time and keep a running tally. Because the prior art systems require making inquiries, and then counting ports one at a time, the process takes a considerable amount of time. Oftentimes 15-20 minutes per switch. When analyzing numerous switches, this time can become very significant.

Further, the user is required to document exactly which ports are available on each switch as he or she goes. This requires extensive record keeping so that the person taking the inventory doesn't forget which ports are free and which are in use. It also presents great potential for error because of the extensive human involvement in the note-taking process.

Thus, there is a need in the art for a system for taking equipment-port inventories that does not have these, and other disadvantages of the conventional methods.

SUMMARY OF THE INVENTION

The present invention solves the above problems by providing a web-based system and method for taking port inventories of computing devices, such as network switches.

In one embodiment, the invention comprises one or more computer-readable media, having computer-usable instructions embodied thereon for performing a method of performing a port inventory for a computing device, said circuit being associated with a number. The method comprises the steps of receiving a device identifier from a client; querying to obtain information including at least one of: (i) a number of ports which are already connected; and (ii) a number of ports which are configured; using said information to determine a number of free ports; and making at least one of said number of free ports and said information available to said client. The method may also comprise running a process on a first server to accomplish at least one of said receiving, querying, and making steps. In one embodiment, the first server is a web server.

A second server, which is associated with the device may also be used. This second server communicates with the device and has a conventional process running on it which is accessed to help accomplish the receiving, querying, and making steps.

In one embodiment, a web page is used for receiving said identifier from said client. This webpage may also be used to display results after the inventory is done. This is usually done by parsing and formatting information existent in a database associated with the second server and using it to create a port-inventory summary.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION OF THE INVENTION

The present invention provides a web-based system and method for conducting port inventories of switches, routers, and other computing devices over the web.

As one skilled in the art will appreciate, the present invention may be embodied as, among other things: a method, system, or computer-program product. Accordingly, the present invention may take the form of a hardware embodiment, a software embodiment, or an embodiment combining software and hardware. In another embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory, other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media include any information-delivery media. By way of example but not limitation, communications media include wired media, such as a wired network or direct-wired connection, and wireless media such as acoustic, infrared, radio, microwave, spread-spectrum, and other wireless media technologies.

The system and method of the present invention are described in FIGS. 1-6.

Figure 1:
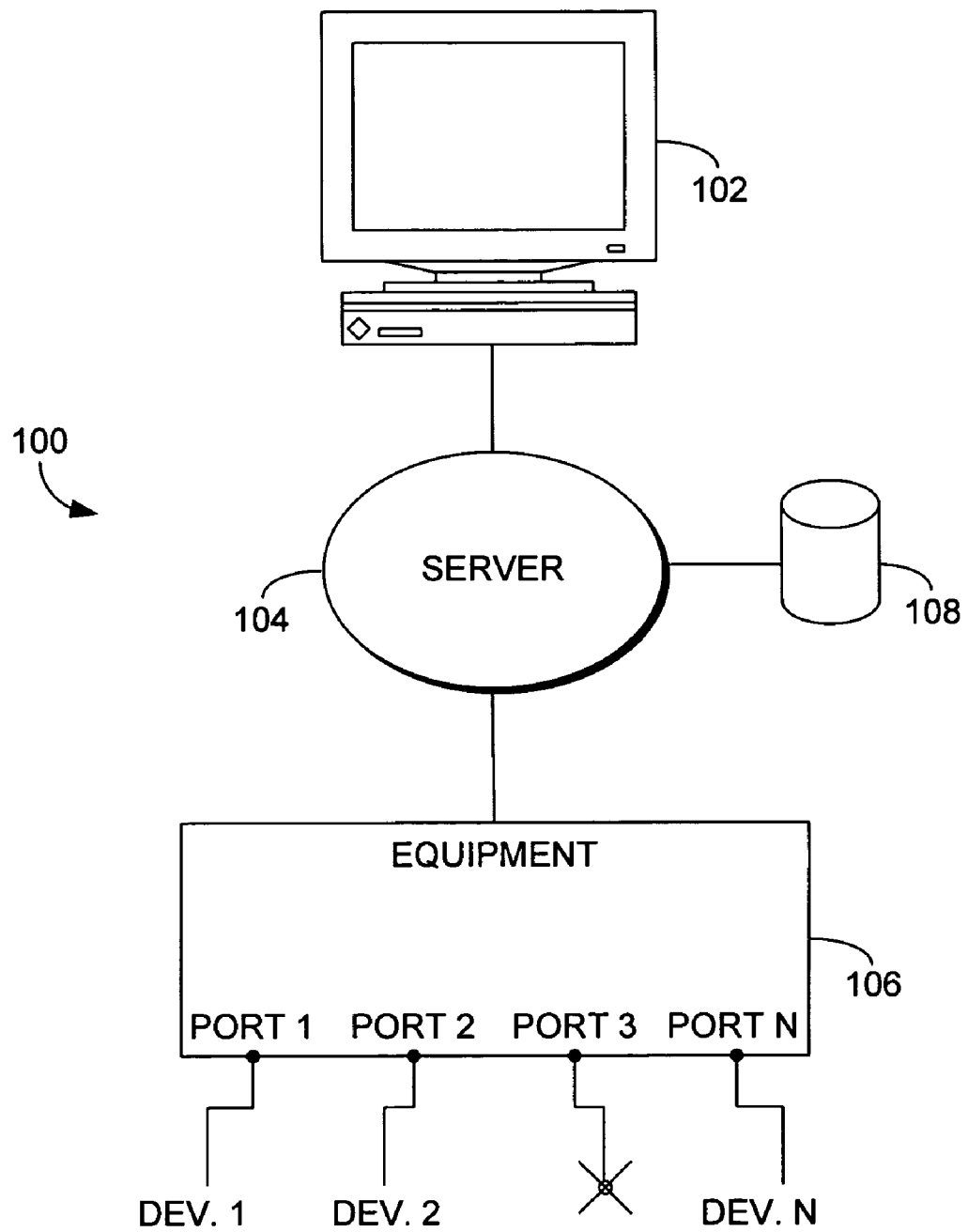
FIG. 1 is a diagram showing a conventional environment in which port inventories are taken.
Figure 2:
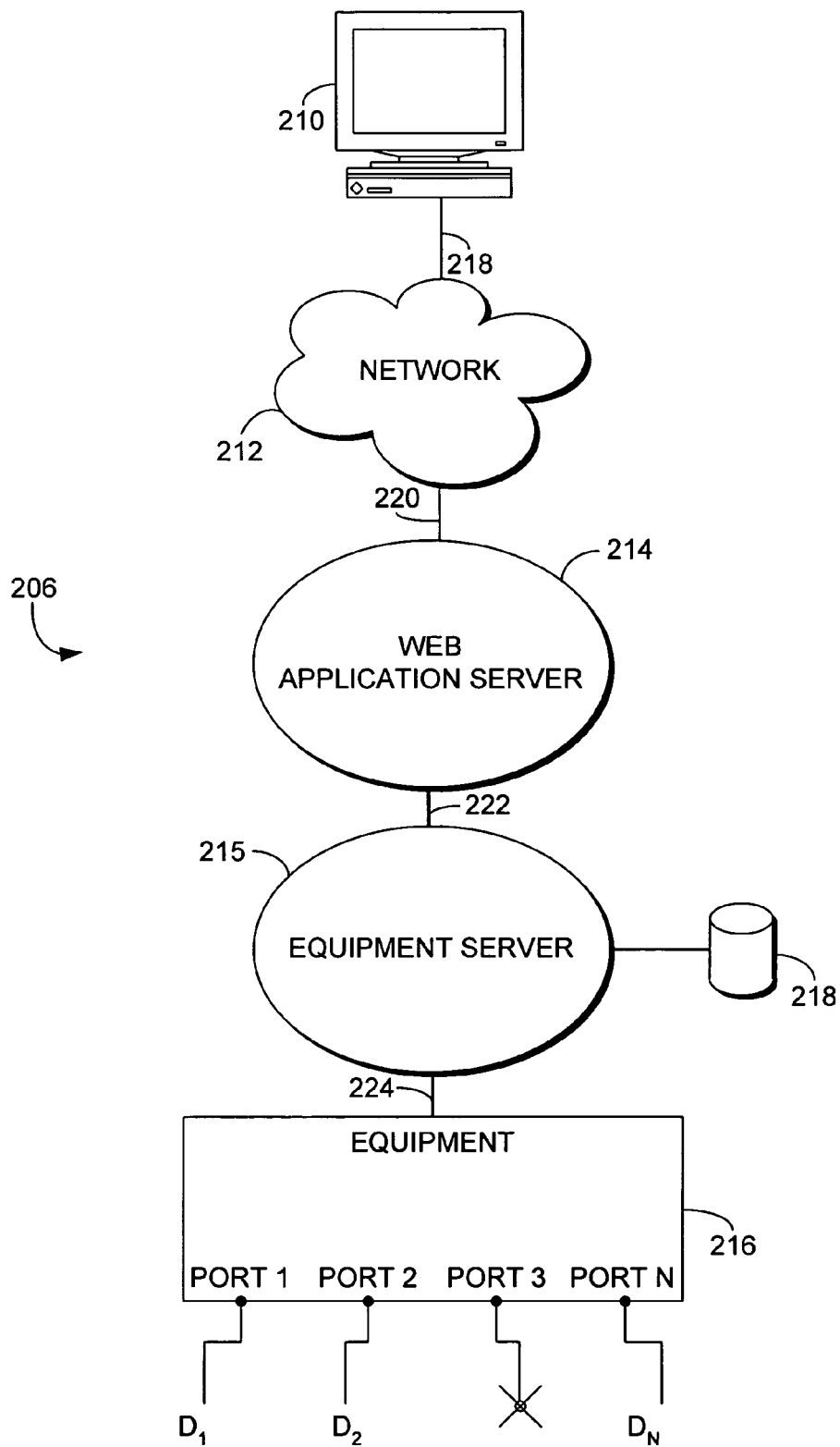
FIG. 2 is a diagram showing an environment in which the system and method of the present invention may be embodied.

Referring first to FIG. 2, we see an embodiment 206 for a system of the present invention. This system comprises a workstation 210, a network 212, a web application server 214, an equipment server 215, and a piece of equipment 216 which is to by inventoried for port availability. Equipment 216 has several ports shown thereon. Like with the FIG. 1 conventional system, equipment 216 has a plurality of ports, $P_1$, $P_2$, $P_3$, and $P_N$. These are the ports which are going to be inventoried. Equipment server 215 has a database 218 associated therewith. This database 218 is used by a process running on equipment server 215 to store information regarding the status of the ports on device 216. Workstation 210 is tapped into the network 212 by a means of a line of communication 218. This could be an Ethernet connection into the network. Alternatively, it could be any other form of network connectivity. USB, wireless, or some form of serial connection all would suffice.

Also included in network 212 is a web application server 214 by way of communication means 220. Means 220 might also be an Ethernet connection or any other form of IP connectivity (e.g., some kind of wireless arrangement).

Equipment server 215 is connected into web application server 214 through another means of connectivity 222. Though not shown in the FIG. 2 embodiment, it is possible that web server 214 and equipment server 215 are both included in and communicate with each other through network 212. The ways in which this could be done will be known to one skilled in the art. Thus, though FIG. 2 shows servers 214 and 215 directly connected, those skilled in the art will recognize that numerous connectivity alternatives exist which would fall within the scope of the invention.

Another possibility here is that the processes running on web server 214 and equipment server 215 are consolidated onto one computing device (server). This arrangement too would fall within the scope of the present invention.

In the embodiment shown, however, equipment server 215 is directly connected into equipment server 216 which communicates with equipment 216 by way of some form of connection 224. Connection 224 may be some form of direct connection, a networked connection, or a wireless one.

The form of connectivity used is not to be considered limiting. It is important to note that each of the means for connectivity, such as conduits 218, 220, 222, and 224, may be any physical form of connectivity (e.g., Ethernet cabling) or even some form of wireless connection which enables electronic communications.

Equipment 216 has a plurality of ports, $P_1$, $P_2$, $P_3$, and $P_N$. Each of these ports is either connected or not. In FIG. 2, $P_1$ is shown physically connected to a computing device $D_1$. $P_2$ is physically connected to a second computing device, $D_2$. $D_1$ and $D_2$ might be any form of computing equipment. In a networking scenario, $D_1$ and $D_2$ could be network switches, telecommunications switches, routers, servers or some other form of computing or electronic equipment. Also evident in FIG. 2 is that $P_3$ is not connected to any device and it should be supposed (though not necessarily shown in the picture) that this port has also not been configured to receive any particular computing device.

Also evident from FIG. 2 is that port $P_N$ is physically connected to a device $D_N$. The reason the variable "N" is used is to denote the fact that numerous ports would be included on a typical switch. Thus, the "N" is used to emphasize that equipment 216 may include many more ports which are not shown in the figure. These types of switches have anywhere from 100 to 300 ports thereon typically. This would make for great duplicitousness if illustrated. Therefore, the FIG. 2 embodiment has been simplified using the variable to more manageably explain the present invention.

Figure 3:
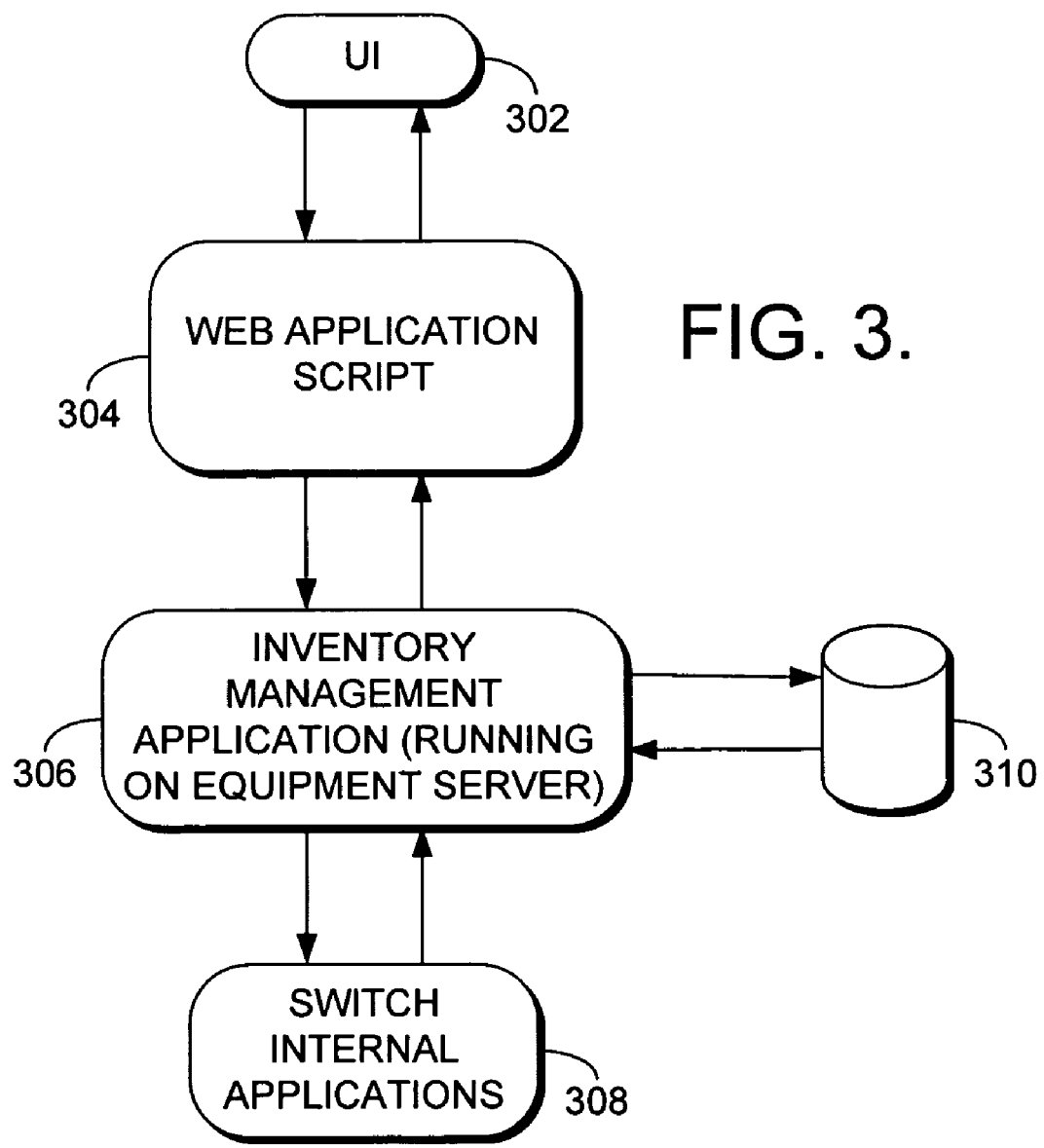
FIG. 3 is a process diagram showing the functions of different components of one embodiment of the present invention.

FIG. 3 is a process diagram. It shows how various processes work on each of the components disclosed in FIG. 2 to accomplish the objectives of the invention. Conceptually speaking, the system provides a user interface 302. This user interface is physically represented by the workstation 210 and network 212 disclosed in FIG. 2. These components give the user the access to enable the user interfacing process 302.

Also included in the processes of the present invention are a web-application script 304. This is most likely a CGI script, the most common form of script used for these purposes. More specifically, the CGI script may be a Perl script as it exists here in the present embodiment. Such scripts will be known to those skilled in the art and are useable with Apache software or other software commonly used for web servers.

Also included in the process is an inventory management application 306 which is running on equipment server 216. Inventory management applications like application 306 interact with a database 310 to store and receive stored information regarding port inventory information. This inventory management application, in the preferred embodiment, is Ciscoworks™. It is also, however, well within the scope of the present invention to use different kinds of asset management software. The use of any form of asset management software may fall within the scope of the present invention, and the invention should not be considered as limited to any particular type.

Also a part of the process are the internal applications commonly run on switch 216. These will be known to those skilled in the art and are also known in the prior art to be interactive with Ciscoworks™ which is running on the equipment server 215.

Figure 4:
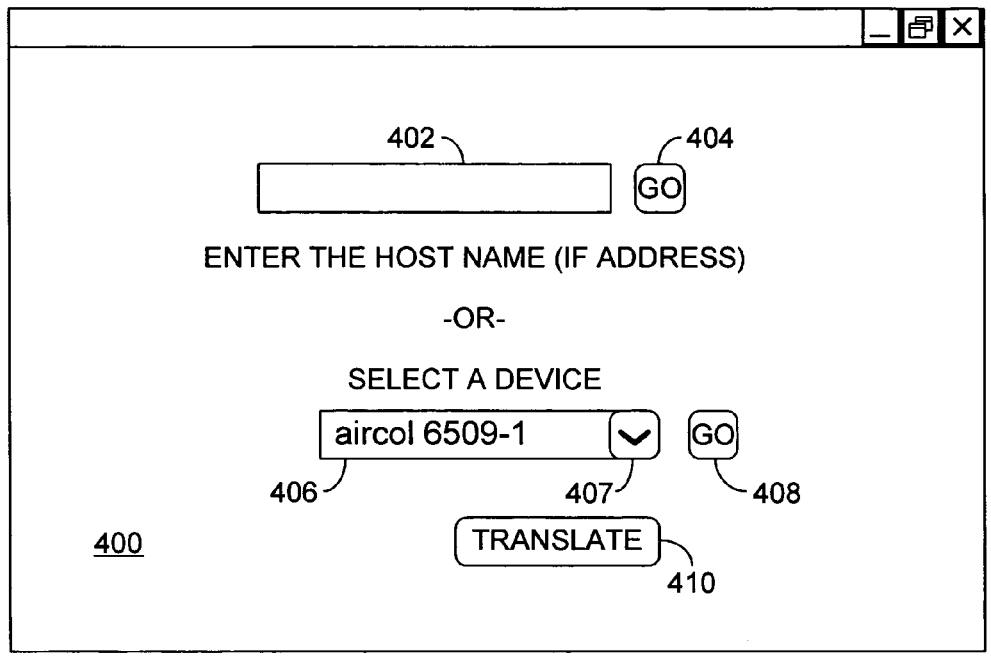
FIG. 4 shows a screen shot of the web form used to input information identifying the particular device/equipment which is to be inventoried with respect to port availability.
Figure 5:
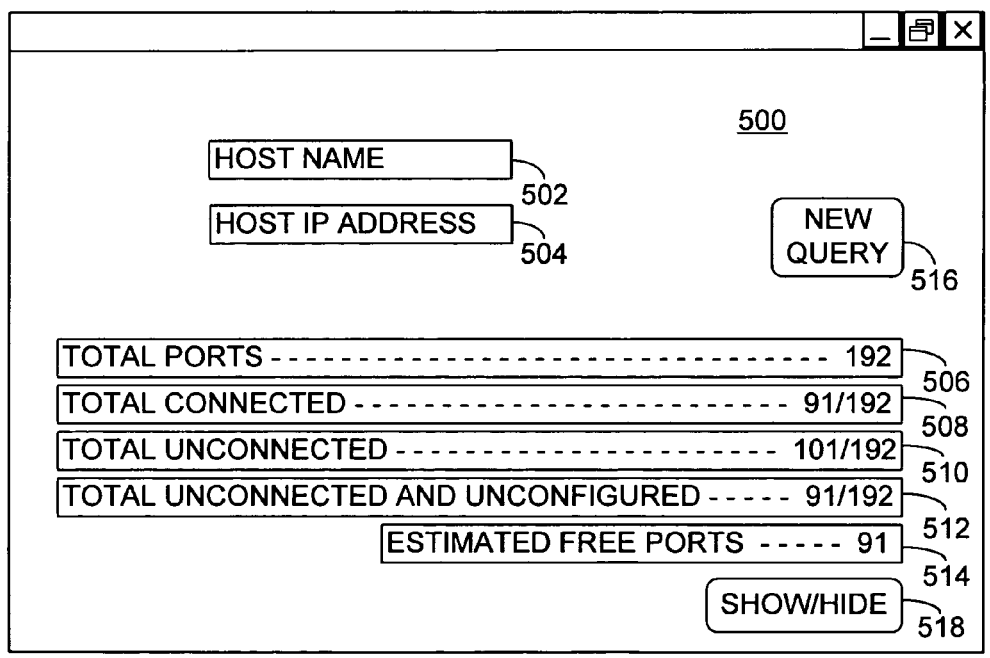
FIG. 5 is a screen shot showing inventory results which are displayed on a web page for the user.

FIGS. 4 and 5 disclose examples of web pages which might be used to accomplish the objectives of the process of the present invention.

Figure 6:
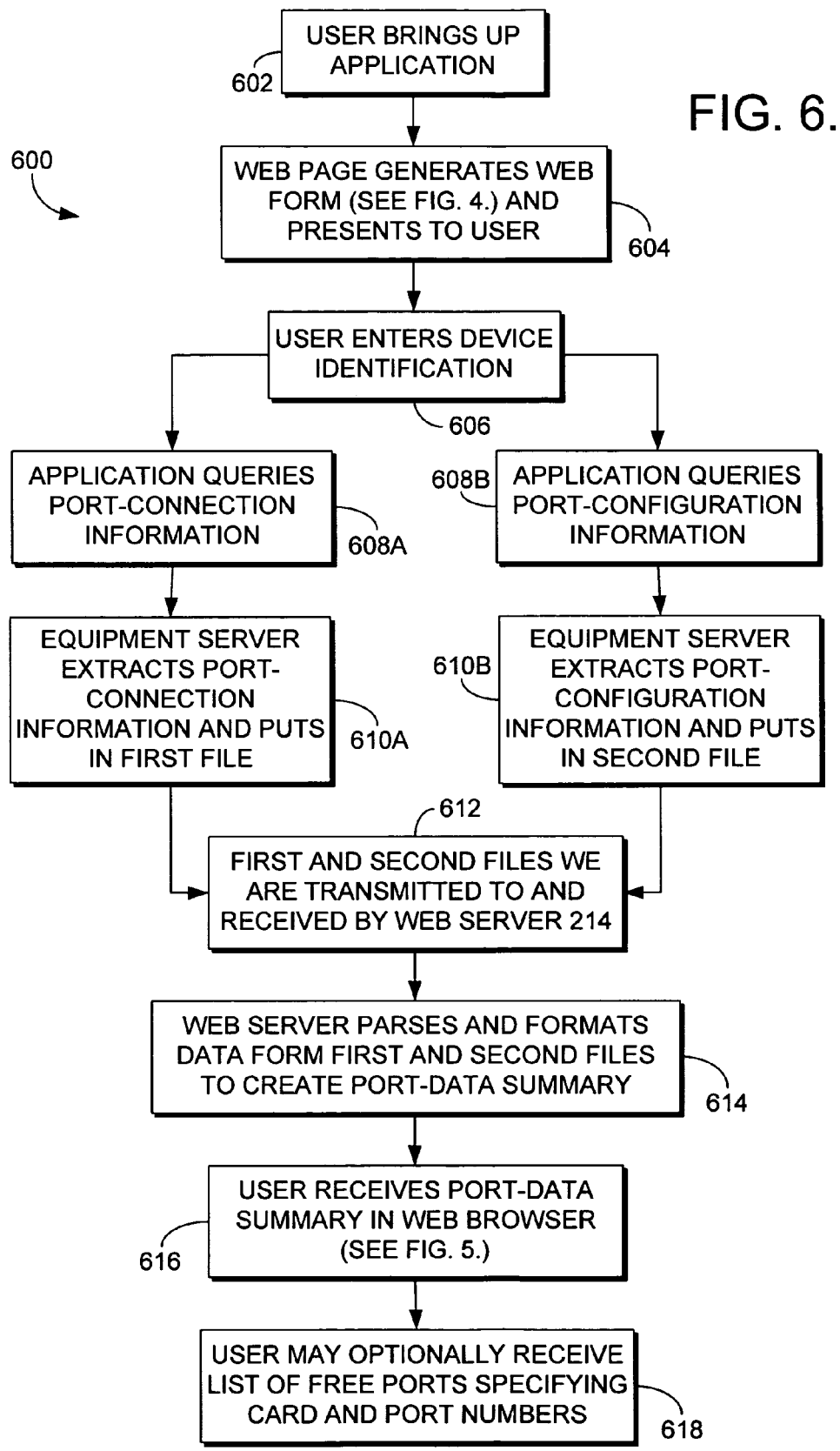
FIG. 6 is a flow diagram showing the steps for one embodiment of the present invention.

One embodiment for this process is disclosed in FIG. 6. The FIG. 6 embodiment includes a process 600 which comprises numerous steps.

In a first step 602, the user brings up the application in that user's web browser on workstation 210. This is done by simply typing in the web address created for the application 304 which is running on web application server 214. This is all done through the network 212. Network 212 might comprise an intranet, as is used in the preferred embodiment. However, this application might be made publicly available over the Worldwide Web if used for different applications. Furthermore, network 212 could be a Local Area Network or some other kind of internal network. The particular type of network used is not to be considered a limitation unless otherwise specified in the claims.

Once web application 304 running on web application server 214 is called up through the web browser on workstation 210, in a next step 604 the application presents the user with a web form 400 like the one shown in FIG. 4. The FIG. 4 web form is generated by an HTML document which is part of the application 304 which is running on web server 214. Web form 400 is presented to the user on workstation 210 in the web browser.

As can be seen in FIG. 4, web form 400 includes a space 402 for allowing the user to enter a host name (e.g., an IP address). This entry may be made possible by providing a toggle 404 which when clicked on will submit the host name entered into space 402. Also included on web form 400 is an optional way to access a particular device. This may be done through a dropdown menu 406 which includes a trigger 407 which enables multiple device descriptions (not shown) to be dropped down onto the screen for optional selection by using trigger 407. Once the user has selected a particular device on the intranet system, that device may be inventoried by hitting a toggle 408 which will transmit the request. The optional ways to connect with the device of space 402 versus dropdown menu 406 in step 606 have been provided to make the web page more user friendly.

After step 606 the process splits into two separate paths in steps 608A and 608B. Steps 608A and 608B are queries. With respect to first query 608A, the application 304 requests port connection information from inventory management application 306 which is running on equipment server 215. Next, in step 610A, inventory management application 306 extracts from database 310 (the same as database 218 in FIG. 2) the requested port connection information and puts it into a first data file. This first data file is transferred from equipment server 215 to application server 214.

In a completely separate track, and either before, after, or at the same time as steps 608A and 610A are occurring, in a step 608B, the application 304 running on web server 214 queries the application 306 running on equipment server 215 with respect to certain port-availability information. This port connection information includes the total number of ports available on device 216, the total number of the ports which are connected to a device and active, the number of ports configured, the total number of unconnected ports on the device, and possibly other information. The way in which inventory management application 306 determines which ports are actually connected is by recalling whether there has been any traffic, or other activity through the port within the most recent past (e.g., the last five minutes). This port configuration information is kept and maintained by the inventory management application 306 in database 310.

Also in step 610B, the port connectivity and configuration information extracted from database 310 is placed into a second data file. This creation of the second file concludes the second prong of the process including step 608B and 610B.

Both prongs of the process are reunited at step 612. In step 612, the first and second files created are transmitted to and received by web server 214.

After receipt, the application 304 running on web server 214 parses and formats data from these first and second files to create a port-data summary in a step 614. This is all done using a CGI script. This script runs on web server 214. This script is a Perl-type CGI script. Perl is a language which is known to those skilled in the art and is typically used to generate CGI scripts. This script causes the first and second files, which in this embodiment are in XML/HTTP, to be received from equipment server 215, and then parses and summarizes them into an HTML/HTTP file which is available through network 212.

Next, the user, in a step 616, receives the port data summary in the web browser of workstation 210 in the form of FIG. 5.

What is displayed to the user is depicted in FIG. 5. FIG. 5 shows a results screen 500 of the present invention. Results screen 500 includes all of the port inventory information made available by the above-described process. More specifically, results screen 500 is a web page which including numerous fields.

Most of these fields will display some kind of result of the inventory of the equipment. A field 502 displays the host name for the device being inventoried. A field 504 includes the host IP address for the device. A field 506 discloses the total number of ports available on the device being inventoried. Here it can be seen that the device includes a total of 192 ports. A field 508 shows the total number of ports on the device which are connected. Here it can be seen that a total of 91 of the 192 ports are actually connected to a device. A next field 510 discloses the total number of ports which are unconnected. This is just a subtraction of the 91 ports from the total 192 which reveals 101 ports unconnected. Another field 512 shows the total ports which are both unconnected and unconfigured. Even though 101 ports were shown in field 510 as being unconnected, some of these ports have been configured with the intent that devices would be later installed as the part of some plan. Thus, field 512 enables the user to know that these configured, yet unconnected ports are to be eliminated from consideration in terms of availability. A next field 514 shows the estimated free number of ports. This number is what is intended to be relied on in terms of installing new equipment or conducting inventories of port availability for another purpose. It is simply derived from field 512, but might be considered to be the bottom-line conclusion on the page.

The FIG. 5 web page also includes a refresh toggle 516. Toggle 516, if clicked on by the user, will cause the FIG. 5 screen to disappear and raise another blank FIG. 4 screen so that the user is able to enter a new query into either fields 402 or 406.

Thereafter, the user may optionally display a list of free ports which specifies card and port numbers in a step 618. This is done by depressing the Show/Hide button 518 shown on web page 500. After depressing this button, particular card and port numbers will be listed sequentially on the FIG. 5 web page at the bottom. For situations where numerous ports are available on a particular device, the viewing of all of the card in port numbers will require the user to scroll down the screen considerably. These listed card and port numbers can be easily printed off and used to direct installers of new equipment, perform asset management, or for other purposes.

A button 516 on web page 500 is provided to enable the user to restart the whole process for a newly selected piece of equipment (e.g., switch) if so desired. By clicking on button 516, the script running as part of the application on web server 214 causes the FIG. 4 web form to be redisplayed on the user's web browser. Entry of a new IP address into field 402, or the selection of a new device from dropdown menu 406, will start the process for a new piece of equipment. Submission of a new and different device then enables the process to be repeated over and over again between the screens of FIG. 4 and FIG. 5. This enables the user to inventory numerous devices rapidly without having to undergo the prior art methods of using the existing inventory management software to obtain the information on a port-by-port basis and then keep a manual record of results.

As can be seen, the present invention and its equivalents are well-adapted to provide a new and useful web-based port-inventory system and method. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims.

While the methods disclosed have been described and shown with reference to particular steps performed in a particular order, it will be understood that these steps may be combined, sub-divided, or reordered to form an equivalent method without departing from the teachings of the present invention. Accordingly, unless specifically indicated otherwise, the order and grouping of steps is not intended to be limiting. And not all steps listed in the various figures need be carried out in the specific order described.

The invention claimed is:

1. One or more computer storage media, having computer-usable instructions executable by a computer for performing a method of performing a port inventory for a computing device, comprising:

receiving an IP address of the computing device over a network connection from a client wherein the computing device has a plurality of ports wherein some of the ports are connected to devices and some of the ports are not connected to the devices;

querying one or more databases to obtain port information about the computing device including (i) a total number of ports in the computing device, (ii) a first number of ports which are connected to the devices wherein said first number of ports which are connected is determined directly from traffic or activity passing through a port, and (iii) a second number of ports which are configured wherein the second number is a subset of the first number;

determining a third number of ports from said port information which are not connected to the devices and a fourth number of ports which are not connected to the devices but are configured for a future use wherein the fourth number of ports is a subset of the third number and wherein a configuration of the fourth number of ports indicates the fourth number of ports can connect and interact with devices when connected in the future use; eliminating the fourth number from the third number to provide a fifth number of ports which is available to the devices for connecting and configuring; and making at least one of said fifth number of ports and said port information available to said client.

2. The media of claim 1, said method comprising:
running a process on a first server to accomplish at least one of said receiving, querying, and making steps.

3. The media of claim 2, said method comprising:
providing a web server to comprise said first server.

4. The media of claim 2, said method comprising:
running a process on a second server which is associated with said device; and
communicating with said device using said process running on said second server to accomplish at least one of said receiving, querying, and making steps.

5. The media of claim 1, wherein said method comprises:
providing a webpage; and receiving said identifier from said client using said webpage.

6. The media of claim 5, said method comprising:
making said port information available to said client using said webpage.

7. The media of claim 6, said method comprising:
availing said client to specific card and port information using said webpage.

8. The media of claim 7, said making step comprising:
placing said information in HTML format; and
delivering said port information to said client using HTTP.

9. The media of claim 1, said method comprising:
including said media in one of machine-readable media, computer-useable instructions, data structures, program modules, RAM, ROM, EEPROM, memory, CD-ROM, digital versatile discs (DVDs), holographic media, optical disc storage, and magnetic storage devices.

10. The media of claim 1, said method comprising:
parsing and formatting said port information to create a port-inventory summary.

11. A computer-implemented method for taking a port inventory on a computing device, said computing device having an IP address, the method comprising:
receiving said IP address of said computing device over a network connection from a client wherein said computing device has a plurality of ports wherein some of the ports are connected to devices and some of the ports are not connected to the devices;
querying one or more databases to obtain port information about said computing device including (i) a total number of ports in said computing device, (ii) a first number of ports which are connected to the devices wherein said first number of ports which are connected is determined directly from traffic or activity passing through a port, and (iii) a second number of ports which are configured wherein said second number is a subset of said first number;
determining a third number of ports from said port information which are not connected to the devices and a fourth number of ports which are not connected to the devices but are configured for a future use wherein said fourth number of ports is a subset of the third number and wherein a configuration of the fourth number of ports indicates the fourth number of ports can connect and interact with devices when connected in the future use;
eliminating the fourth number from the third number to provide a fifth number of ports which is available to the devices for connecting and configuring; and making at least one of said fifth number of ports and said port information available to said client.

12. The method of claim 11 comprising:
running a process on a first server to accomplish at least one of said receiving, querying, and making steps.

13. The method of claim 11 comprising:
providing a web server to comprise said first server.

14. The method of claim 12 comprising:
running a process on a second server which is associated with said device; and
communicating with said device using said process running on said second server to accomplish at least one of said receiving, querying, and making steps.

15. The method of claim 11 comprising:
providing a webpage; and
receiving said identifier from said client using said webpage.

16. The method of claim 11 comprising:
providing a webpage; and
receiving said number from said human client using said webpage.

17. The method of claim 16 comprising:
making said port information available to said client using said web page.

18. The method of claim 17 comprising:
availing said client to specific card and port information using said web page.

19. The method of claim 11, said making step comprising:
placing said information in XML format; and
delivering said port information to said client using HTTP.

20. The method of claim 11, said method comprising:
parsing and formatting said port information to create a port-inventory summary.

* * * * *